United States Patent
McDonald et al.

(10) Patent No.: US 9,934,428 B2
(45) Date of Patent: Apr. 3, 2018

(54) METHOD AND SYSTEM FOR DETECTING PEDESTRIANS

(71) Applicant: Connaught Electronics Ltd., Tuam (IE)

(72) Inventors: James McDonald, Galway (IE); John McDonald, Galway (IE)

(73) Assignee: Connaught Electronics Limited, Tuam, County Calway (IE)

( * ) Notice: Subject to any disclaimer, the term of this patent is extended or adjusted under 35 U.S.C. 154(b) by 54 days.

(21) Appl. No.: 14/907,744

(22) PCT Filed: Jul. 30, 2014

(86) PCT No.: PCT/EP2014/066343
§ 371 (c)(1),
(2) Date: Jan. 26, 2016

(87) PCT Pub. No.: WO2015/014878
PCT Pub. Date: Feb. 5, 2015

(65) Prior Publication Data
US 2016/0180159 A1    Jun. 23, 2016

(30) Foreign Application Priority Data

Jul. 31, 2013 (DE) .......................... 10 2013 012 778

(51) Int. Cl.
| | |
|---|---|
| *G06K 9/00* | (2006.01) |
| *G06T 7/215* | (2017.01) |
| *G06T 7/136* | (2017.01) |

(52) U.S. Cl.
CPC ..... *G06K 9/00369* (2013.01); *G06K 9/00805* (2013.01); *G06T 7/136* (2017.01);
(Continued)

(58) Field of Classification Search
None
See application file for complete search history.

(56) References Cited

U.S. PATENT DOCUMENTS

| | | | |
|---|---|---|---|
| 7,346,191 B2 | 3/2008 | Sano | |
| 8,189,051 B2 * | 5/2012 | Shih | ........................ G06T 7/215 348/169 |

(Continued)

FOREIGN PATENT DOCUMENTS

JP    2009-157581 A    7/2009

OTHER PUBLICATIONS

International SearchReport issued in corresponding application No. PCT/EP2014/066343 dated Dec. 3, 2014 (3 pages).

(Continued)

*Primary Examiner* — Nancy Bitar
(74) *Attorney, Agent, or Firm* — Osha Liang LLP

(57) ABSTRACT

The invention relates to a method for detecting a pedestrian (27) moving in an environmental region of a motor vehicle relatively to the motor vehicle based on a temporal sequence of images (18) of the environmental region, which are provided by means of a camera of the motor vehicle (1), wherein characteristic features are extracted from the images (18) and a plurality of optical flow vectors is determined to the characteristic features of at least two consecutively captured images of the sequence by means of an image processing device of the motor vehicle, which indicate a movement of the respective characteristic features over the sequence, wherein for detecting the pedestrian (27), several confidence metrics are determined based on the characteristic features and the optical flow vectors, and based on the confidence metrics, it is examined if a preset plausibility check criterion required for the detection of the pedestrian (27) is satisfied, wherein the pedestrian (27) is supposed to be detected if the plausibility check criterion with respect to the confidence metrics is satisfied.

10 Claims, 5 Drawing Sheets

Figure 1:
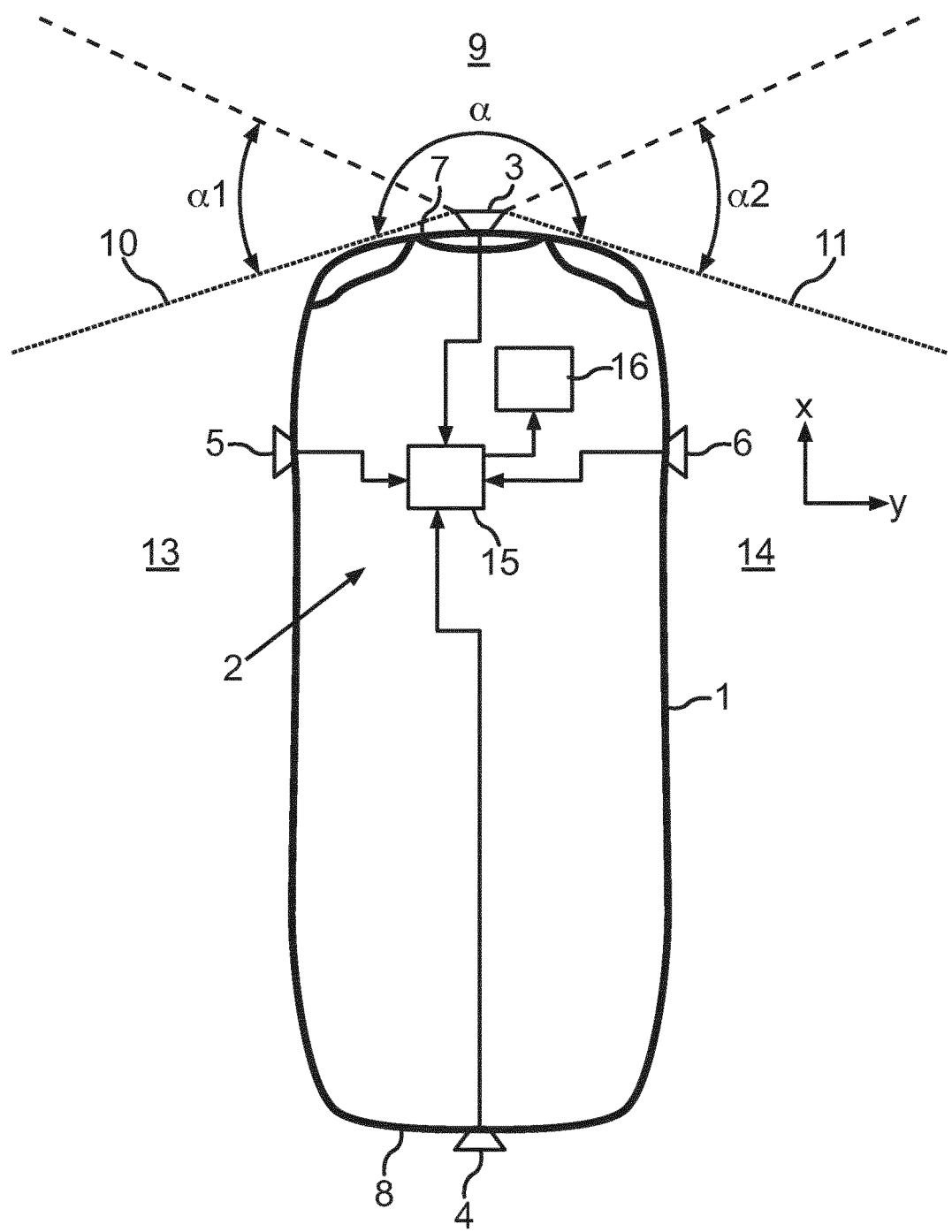

(52) U.S. Cl.
CPC .......... *G06T 7/215* (2017.01); *G06K 9/00348* (2013.01); *G06T 2207/30196* (2013.01); *G06T 2207/30241* (2013.01); *G06T 2207/30261* (2013.01)

(56) References Cited

U.S. PATENT DOCUMENTS

| | | | | |
|---|---|---|---|---|
| 8,395,659 | B2* | 3/2013 | Nishigaki | G06T 7/254 348/153 |
| 8,798,868 | B2* | 8/2014 | Mares | B60T 8/1755 104/282 |
| 9,036,424 | B2* | 5/2015 | Lee | G11C 16/06 365/185.05 |
| 2004/0234136 | A1* | 11/2004 | Zhu | G06K 9/3241 382/224 |
| 2013/0184940 | A1* | 7/2013 | Stoll | B60R 21/01 701/45 |
| 2016/0210521 | A1* | 7/2016 | Traxler | G06K 9/03 |

OTHER PUBLICATIONS

Written Opinion issued in corresponding application No. PCT/EP2014/066343 dated Dec. 3, 2014 (6 pages).

Christian Wojek, et al.; "Multi-Cue Onboard Pedestrian Detection"; 2009 IEEE Conference on Computer Vision and Pattern Recognition, CVPR 2009; Miami, Florida, USA; Jun. 20-25, 2009; pp. 794-801 (8 pages).

Atsuto Maki, et al.; "Detecting bipedal motion from correlated probabilistic trajectories"; Pattern Recognition Letters, vol. 34, No. 15; Jan. 4, 2013; pp. 1808-1818 (11 pages).

Atsuto Maki, et al.; "Co-Occurrence Flow for Pedestrian Detection"; Image Processing (ICIP), 2011 18th IEEE International Conference on Image Processing; pp. 1889-1892; Sep. 11, 2011 (4 pages).

Ryuichi Matsuda, et al.; "Detection of Pedestrians Employing a Wide-angle Camera"; 2011 11th International Conference on Control, Automation and Systems, Kintex, Gyeonggi-do, Korea; Oct. 26-29, 2011; pp. 1748-1751 (4 pages).

Shanshan Zhang, et al.; "Moving Pedestrian Detection Based on Motion Segmentation"; Robot Vision (WORV), 2013 IEEE Workshop; Jan. 15, 2013; pp. 102-107 (6 pages).

Navneet Dalal, et al.; "Human Detection Using Oriented Histograms of Flow and Appearance"; Computer Vision—ECCV 2006 Lecture Notes in Computer Science: LNCS, Springer, Berlin, DE; 2006; pp. 428-441 (14 pages).

Piotr Dollar, et al.; "Pedestrian Detection: An Evaluation of the State of the Art"; IEEE Transactions on Pattern Analysis and Machine Intelligence, IEEE Computer Society, USA, vol. 34, No. 4; Apr. 2012; pp. 743-761 (19 pages).

\* cited by examiner

METHOD AND SYSTEM FOR DETECTING PEDESTRIANS

The invention relates to a method for detecting a pedestrian moving in an environmental region of a motor vehicle relatively to the motor vehicle based on a temporal sequence of images of the environmental region, which are provided by means of a camera of the motor vehicle, wherein characteristic features are extracted from the images and a plurality of optical flow vectors are determined to the characteristic features of at least two consecutively captured images of the sequence by means of an image processing device. The optical flow vectors indicate a movement of the respective characteristic features over the sequence of the images. In addition, the invention relates to a camera system for performing such a method as well as to a motor vehicle with such a camera system.

Camera systems for motor vehicles are already known from the prior art. As is known, such a camera system includes at least one camera attached to the motor vehicle and capturing an environmental region of the motor vehicle. The camera provides images of the environmental region. Several such cameras can also be employed, which capture the entire environment around the motor vehicle. The camera mounted on the motor vehicle captures a temporal succession of images of the environmental region, namely for example a plurality of images per second. This temporal sequence of images is communicated to an electronic image processing device processing the captured images and being able to provide very different functionalities in the motor vehicle based on the images.

Presently, the interest is directed to the detection of a pedestrian located in the environmental region and additionally moving relatively to the motor vehicle, in particular approaching the motor vehicle.

In order to detect a pedestrian—or generally speaking an object—it is already prior art to extract characteristic features from an image of the environmental region and to evaluate them. Basically, any features can be detected as characteristic features, such as for example so-called Harris points or so-called FAST features. For detecting a pedestrian, the characteristic features are usually grouped in so-called clusters in the prior art, and the clusters are subjected to pattern recognition. However, such an approach has proven particularly expensive and thus requires much computational power, but which is available in motor vehicles only in restricted manner. Such a computational power is in particular not available in so-called embedded systems, which nowadays are increasingly employed in motor vehicles.

In order to be able to detect or even track target objects in the environmental region, in the prior art, the optical flow method is furthermore used, for example the so-called Lukas Kanade method. It includes that an optical flow vector is defined to each characteristic feature, which characterizes the direction of movement and the speed of movement of the feature over the sequence of images. Therein, each characteristic feature of an image is associated with a corresponding feature of the next image such that feature pairs are determined. A displacement of the characteristic features of a feature pair then defines the associated optical flow vector.

For detecting pedestrians, in the prior art, stereo cameras are additionally employed, which provide three-dimensional image data. However, this is associated with the disadvantage that such stereo cameras are only rarely employed and additionally are associated with additional cost and correspondingly need more installation space.

A method for detecting moving objects in the environmental region of a motor vehicle is for example known from the document U.S. Pat. No. 7,346,191 B2. This method too is based on the optical flow method, in which flow vectors of characteristic features are determined based on each two consecutive images of a camera. Then, a focus of expansion is calculated from these flow vectors. Then, a histogram is formed from the foci of expansion, based on which a movable object is detected. This method too is relatively expensive because first the foci of expansion have to be calculated from the flow vectors.

It is an object of the invention to demonstrate a solution, how in a method of the initially mentioned kind, a pedestrian can be reliably detected without much computational effort, in particular without having to perform pattern recognition based on the characteristic features.

According to the invention, this object is solved by a method, by a camera system as well as by a motor vehicle having the features according to the respective independent claims. Advantageous implementations of the invention are the subject matter of the dependent claims, of the description and of the figures.

A method according to the invention serves for detecting a pedestrian moving in an environmental region of a motor vehicle relatively to the motor vehicle, in particular approaching the motor vehicle. The pedestrian is detected based on a temporal sequence of images of the environmental region. The images are provided by means of a camera disposed on the motor vehicle. Characteristic features are detected in the images by means of an image processing device of the motor vehicle, and a plurality of optical flow vectors is determined to the characteristic features of at least two consecutively captured images. The flow vectors characterize a movement of the respective characteristic features over the sequence of the images. For detecting the pedestrian, respective values for several confidence metrics are determined based on the characteristic features and the optical flow vectors. Based on the current values of the confidence metrics, it is then examined whether or not a preset plausibility check criterion required for the detection of the pedestrian is satisfied. The pedestrian is supposed to be detected if (in particular already and only if) the plausibility check criterion with respect to the confidence metrics is satisfied.

Thus, according to the invention, it is provided that a multiplicity of confidence metrics is predefined and the respective values of these confidence metrics are determined based on the characteristic features and the optical flow vectors in order to then determine whether or not the preset plausibility criterion is satisfied based on the current values of the confidence metrics. In such a manner, pedestrians can be particularly simply detected, who are located in the environmental region and for example approach the motor vehicle. It is only sufficient that the current values of the confidence metrics are examined by means of a plausibility check device, and depending on this examination of the current confidence metrics, the presence of a pedestrian can be inferred. Without pattern recognition, thus, a pedestrian can be detected solely by evaluation of the current values of the confidence metrics, for example by means of a threshold value criterion. Therein, the pedestrian recognition is particularly fast and computationally efficiently effected and therefore can also be implemented in so-called embedded systems, as they are today employed in motor vehicles. In addition, a priori assumptions are not required for the pedestrian recognition such that the proposed algorithm is particularly reliable and precise. Therein, preferably, it is determined merely in binary manner by means of a threshold value criterion whether or not the pedestrian is present in the environmental region or in a preset region of interest. An exact determination of the position of the pedestrian and tracking, respectively, are not required.

Preferably, the camera is an image capturing device, which is able to detect light in the visible spectral range and thus to provide images. The camera can for example be a CCD camera or a CMOS camera. Preferably, the camera is a video camera providing a sequence of images per second.

In an embodiment, a threshold value can be preset for each confidence metric, and the preset plausibility check criterion can include that all of the confidence metrics pass the respectively associated threshold value, for example exceed it. In this embodiment, the pedestrian is detected if each confidence metric passes the respectively associated threshold value. In this manner, the plausibility check criterion can be implemented as a threshold value criterion without much effort. It is only sufficient that it is determined that all of the confidence metrics exceed or fall below the respective threshold value, and the pedestrian detection can be immediately signaled.

It proves advantageous if a plurality of properties of the characteristic features and/or of the optical flow vectors is determined and a confidence metric is respectively defined to each property, the value of which is determined depending on the respective property. Depending on the given application, respectively different properties of the characteristic features and/or of the optical flow vectors can be defined in order to be able to detect the pedestrian for example in different road situations.

Below, the concrete confidence metrics are described in more detail:

In an embodiment, the number of the characteristic features and/or the number of the optical flow vectors can be determined as a property. Depending on this number, then, a confidence metric associated with this property can be determined, which represents a variable, the value of which is determined depending on the number of the features and/or of the flow vectors. This confidence metric can for example have a value, which corresponds to the number of the characteristic features and/or to the number of the optical flow vectors in the current image. This embodiment exploits the fact that a moving pedestrian always causes a minimum number of characteristic features with flow vectors and thus a minimum number of optical flow vectors in the image. In order to make plausible the pedestrian detection, this confidence metric can thus be examined. For example, the pedestrian can only be detected if this confidence metric exceeds a preset threshold value.

Additionally or alternatively, a magnitude of the optical flow vectors can also be determined as a property. With this property too, a confidence metric is associated, the value of which depends on the magnitude of the optical flow vectors. Therein, the magnitude of a flow vector means the length of this flow vector. This embodiment has the advantage that false detections due to a noise signal can be prevented. Therein, the associated confidence metric can for example be proportional to an average of the magnitudes of the detected flow vectors. Here, the pedestrian can for example only be detected if this confidence metric is greater than a preset threshold value. Thus, it can be differentiated between actual pedestrians on the one hand and the noise in the images on the other hand.

Additionally or alternatively, a direction of the optical flow vectors can also be determined as a property. With this property too, a separate confidence metric can be associated, the value of which is determined depending on the direction of the optical flow vectors. This embodiment has the advantage that thus only the relevant pedestrians can be detected, who approach the motor vehicle. Here, the determination of the confidence metric can be effected such that this confidence metric is incremented if the number of the flow vectors towards the motor vehicle is greater than the number of the opposite flow vectors, which point away from the motor vehicle. Correspondingly, this confidence metric can be decremented if the number of the opposite flow vectors is greater. Thus, this confidence metric can be varied over the sequence of images.

Further additionally or alternatively, the number of characteristic features can be determined as a property, the flow vectors of which have the same direction. To this property too, a confidence metric can be defined, the value of which for example corresponds to the number of the flow vectors with the same direction in the current image. In this embodiment, a pedestrian can in particular only be detected if this confidence metric exceeds an associated threshold value.

Furthermore additionally or alternatively, a spatial distribution of the characteristic features in the images can be determined as a property. To this property too, a separate confidence metric can be defined, the value of which can be determined depending on the spatial distribution of the characteristic features in the current image frame. Thus, the detection can further be made plausible.

The characteristic features can also be tracked over the sequence of the images. As a property of the characteristic features, then, a period of time can be determined, which has elapsed since the first detection of the respective feature. In other words, here, the "lifetime" of the characteristic features is determined, i.e. the number of the images, in which one and the same feature was already detected. To this property too, a separate confidence metric can be defined, the value of which is determined depending on the lifetime of the features and for example corresponds to the average lifetime of all of the features. In particular, the pedestrian can only be detected if this confidence metric exceeds a threshold value. Thus, false detections due to noise can be prevented.

Additionally or alternatively, a change of the direction and/or a change of the magnitude of the optical flow vectors over the sequence of the images can also be determined as a property. By the variation of the direction and/or the variation of the magnitude, for example, temporal movement patterns or oscillations of the characteristic features over the time can be detected, as they in particular occur with the pedestrians due to the movement of the legs and the arms. Depending on the change of direction and/or change of magnitude of the flow vectors too, a corresponding confidence metric can be defined, the value of which is for example proportional to the speed of the variation of direction and/or the variation of magnitude.

In this context, it can also be provided that the number of flow vectors is determined as a property, which have a magnitude decreasing and/or increasing over the sequence of the images. Here too, a separate confidence metric can be defined, the current value of which depends on the number of these flow vectors and for example corresponds to this number. To this confidence metric too, a threshold value can be defined and the detection of a pedestrian can be supposed if this confidence metric exceeds the threshold value. Thus, procedures are detected, which are specific to the oscillating movement of the arms and legs of a pedestrian. In other words, this confidence metric serves for detecting oscillations of the flow vectors, as they usually occur due to the movement of the arms and the legs.

In addition, the invention relates to a camera system for a motor vehicle including a camera for providing a sequence of images of an environmental region of the motor vehicle, and including an image processing device adapted to perform a method according to the invention.

A motor vehicle according to the invention, in particular a passenger car, includes a camera system according to the invention.

The preferred embodiments presented with respect to the method according to the invention and the advantages thereof correspondingly apply to the camera system according to the invention as well as to the motor vehicle according to the invention. Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings. It is emphasized that the embodiment described below represents a preferred embodiment of the invention and the invention is therefore not restricted to this exemplary embodiment.

Figure 2:
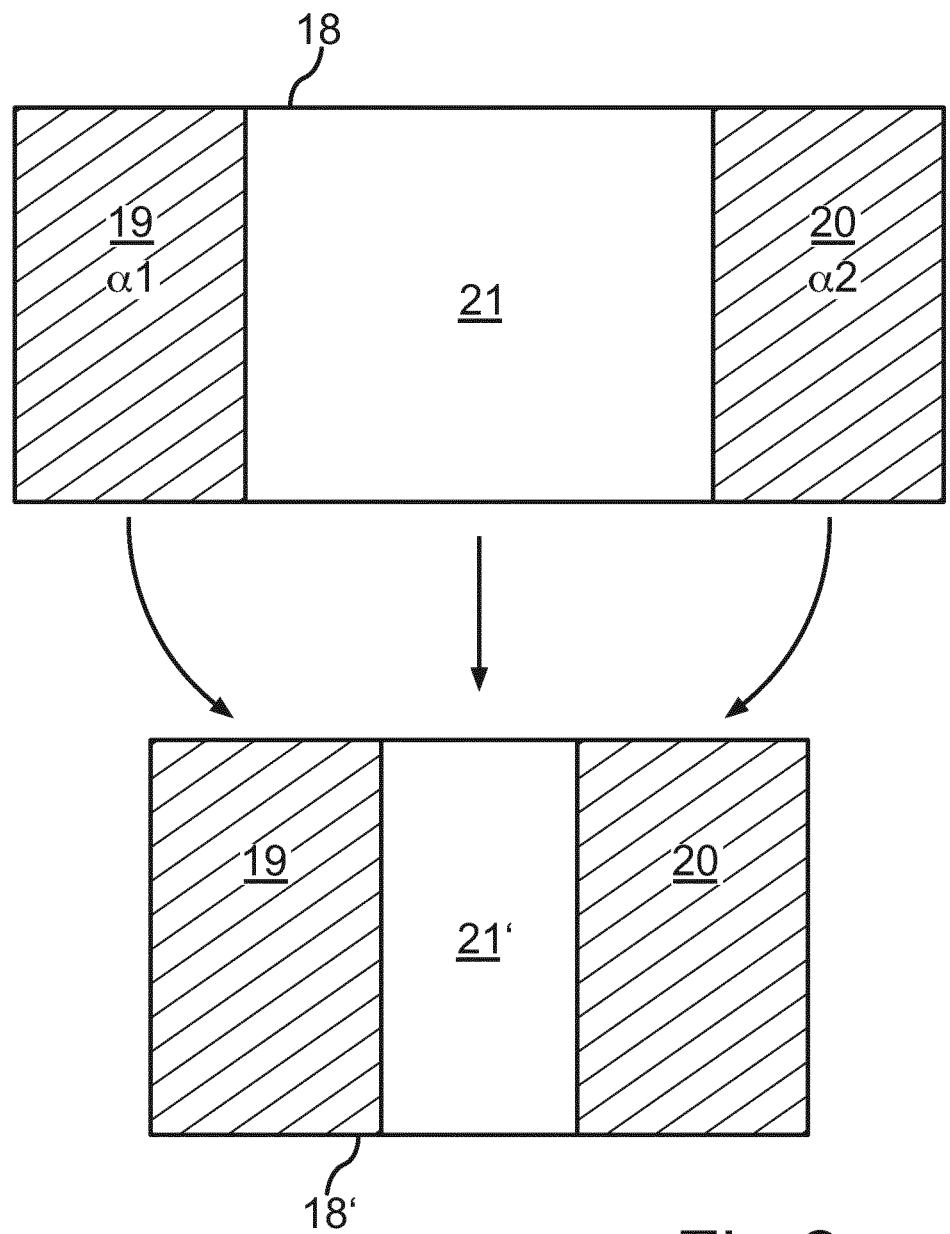
Figure 3:
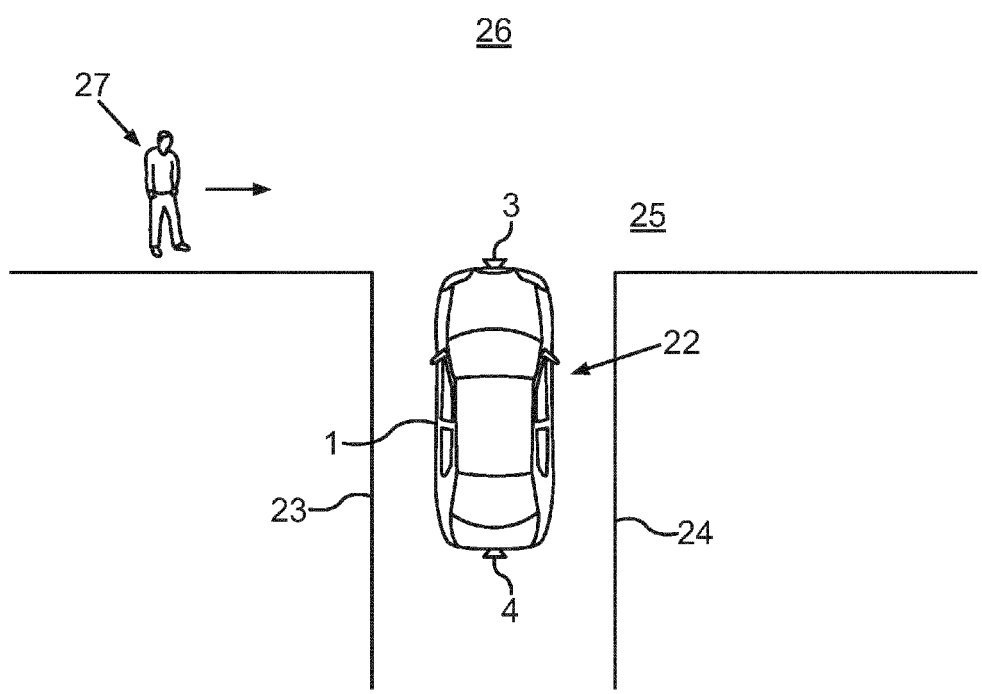
Figure 4:
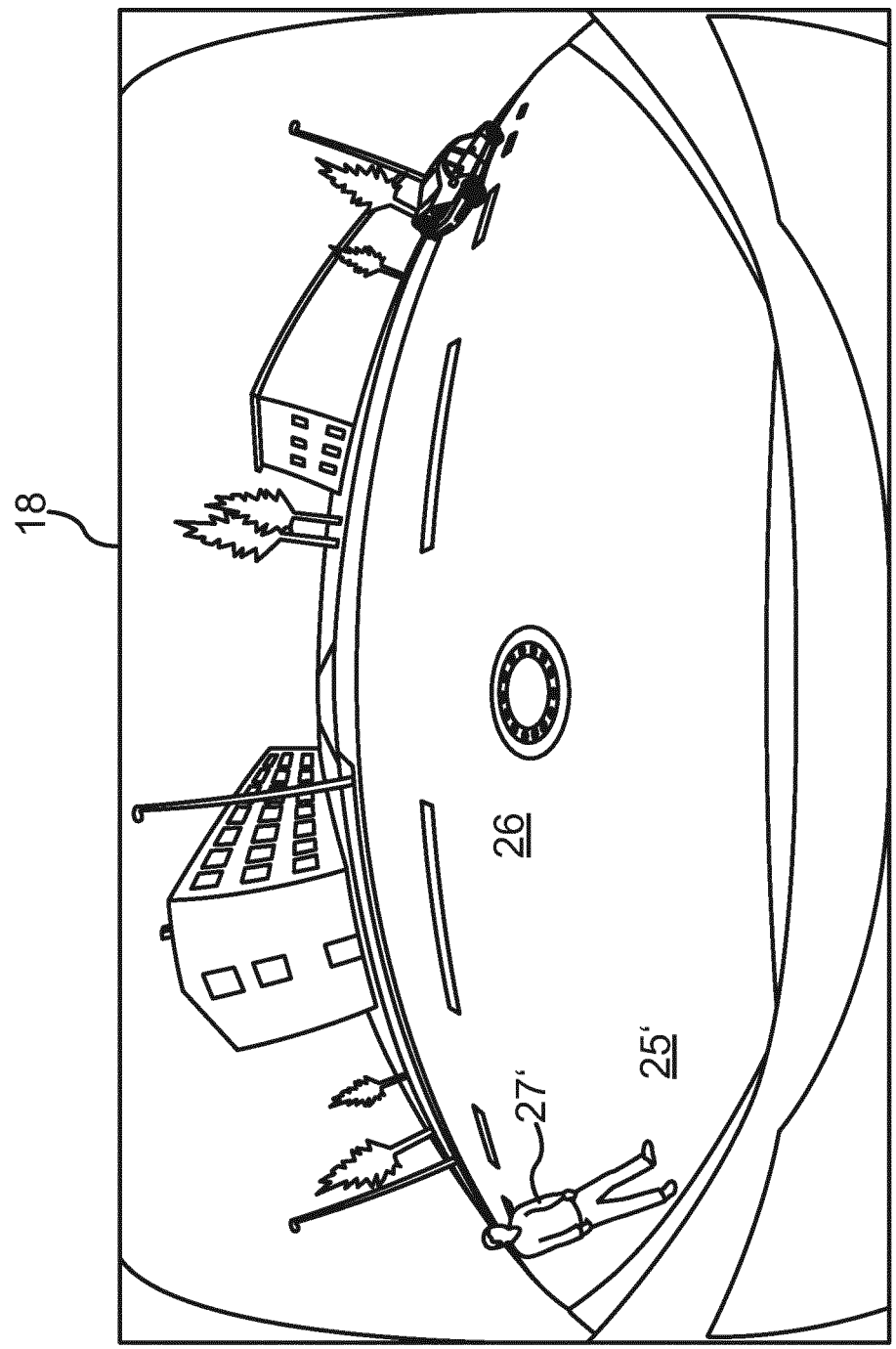
Figure 5:
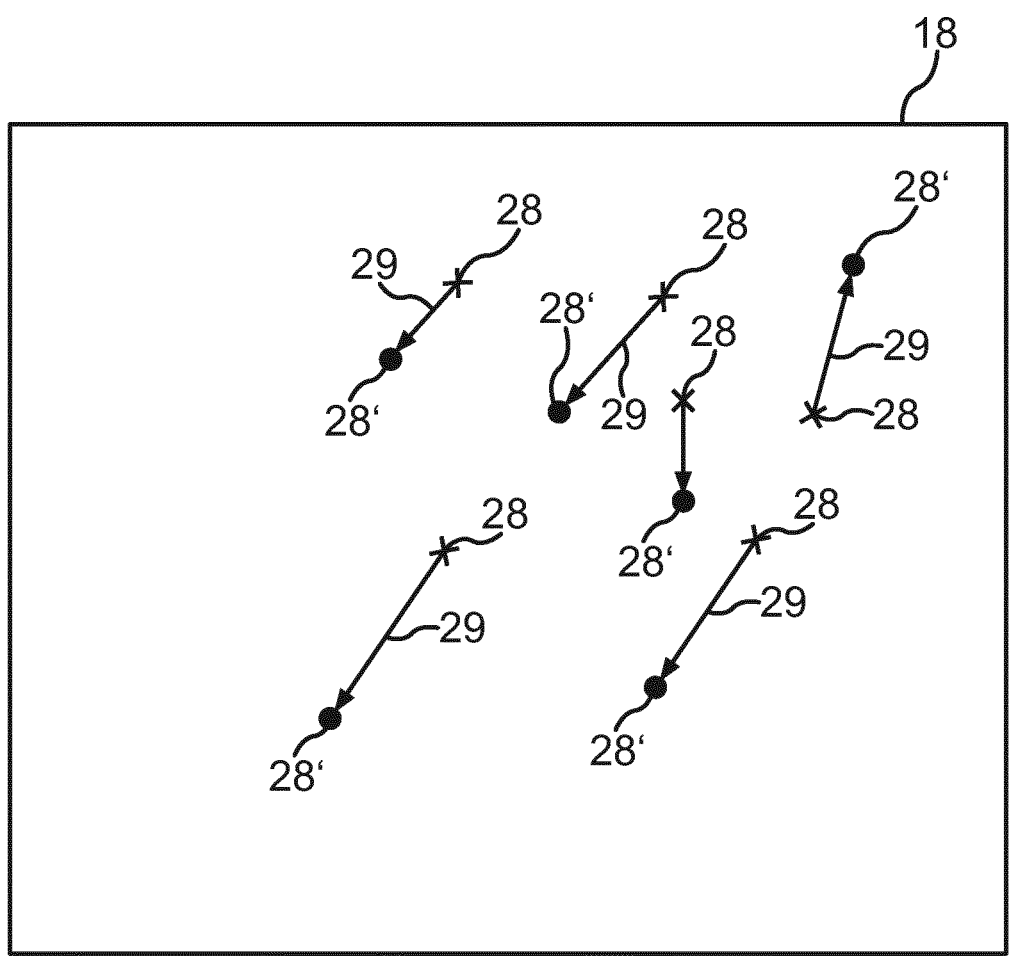

There show:

FIG. 1 in schematic illustration a motor vehicle with a camera system according to an embodiment of the invention;

FIG. 2 in schematic illustration an image, wherein a method according to an embodiment of the invention is explained in more detail;

FIG. 3 an exemplary road situation for explaining the method;

FIG. 4 an exemplary image, which is captured in the road situation according to FIG. 3; and FIG. 5 a schematic illustration for explaining the optical flow.

A motor vehicle 1 illustrated in FIG. 1 is for example a passenger car. The motor vehicle 1 has a camera system 2 with for example four cameras 3, 4, 5, 6, which are disposed distributed on the motor vehicle 1. The cameras 3, 4, 5, 6 for example overall capture the environment around the motor vehicle 1. For example, the entire environment of the motor vehicle 1 and therefore a 360° image can be captured.

The camera 3 is a front camera disposed in the front area of the motor vehicle 1, for example on a front bumper 7. The camera 3 is therefore disposed on a front of the motor vehicle 1. The second camera 4 is for example a rear view camera, which is mounted in the rear area of the motor vehicle 1, for example on a rear bumper 8 or a tailgate. The lateral cameras 5, 6 can be integrated in the respective exterior mirrors.

The first camera 3 captures an environmental region 9 in front of the motor vehicle 1. In the embodiment, the camera 3 is disposed centrally on the front bumper 7 and has a relatively wide opening angle α, which may for example be in a range of values from 170° to 200°. Therein, the camera axis of the camera 3 extends along a center longitudinal axis of the motor vehicle 1 and thus parallel to a vehicle longitudinal axis x. A vehicle coordinate system x,y is defined to the vehicle 1.

The camera 3 can for example be a fish-eye camera, which has a wide opening angle α. Therein, the angle α is defined between two lines 10, 11. Thus, the camera 3 also captures the environmental regions in front laterally besides the motor vehicle 1, namely both on the left side and on the right side.

Correspondingly, the camera 4 captures an environmental region 12 behind the motor vehicle 1. The camera 4 can also be disposed centrally on the rear bumper 8. It can also have an opening angle, which is relatively wide and for example is in a range of values from 170° to 200°. Thus, the above explanations with respect to the front camera 3 can apply to the rear view camera 4 in analogous manner.

The lateral cameras 5, 6 each capture the environmental region 13 and 14, respectively, laterally besides the motor vehicle 1.

The number as well as the arrangement of the cameras 3, 4, 5, 6 are only exemplarily illustrated in FIG. 1 and can vary according to embodiment.

The cameras 3, 4, 5, 6 can for example be CCD cameras or CMOS cameras. They can also be video cameras, which each are able to provide a plurality of frames per second. These images are communicated to a central image processing device 15 processing the images of all of the cameras 3, 4, 5, 6.

Optionally, the image processing device 15 can be coupled to an optical display device 16, which may for example be an LCD display. On the display 16, then, very different views can be presented, which can be selected according to driving situation. For example, the image processing device 15 can generate an overall presentation from the images of all of the cameras 3, 4, 5, 6, which shows the motor vehicle 1 and its environment 9, 12, 13, 14 from a bird's eye view and thus from a point of view, which is located above the motor vehicle 1. Such a "bird eye view" is already prior art and can be generated by image processing.

The camera system 2 can also be switched to an assistance mode, in which the images or at least image regions of the camera 3 and/or of the camera 4 are presented on the display 16. Because the camera 3 is disposed on the front bumper 7, the point of view, from which the images are captured, is also on the bumper 7, namely exactly at the location, at which the camera 3 is placed. Correspondingly, the point of view, from which the images are generated by means of the camera 4, is on the rear bumper 8.

An image 18 captured by means of the camera 3 or 4 is shown in FIG. 2 in schematic and abstract illustration. For the above mentioned assistance mode, in which the images of the camera 3 or of the camera 4 are displayed on the display 16, in particular lateral edge regions 19, 20 are of interest, which correspond to respective edge regions α1, α2 of the opening angle α according to FIG. 1. The edge region 19 shows the environmental region 9 in front of and laterally besides the motor vehicle 1 from a direction of view, which extends substantially parallel to the vehicle transverse axis y. Correspondingly, the edge region 20 of the image 18 shows the environmental region 9 in front of and laterally to the right besides the motor vehicle 1, wherein here too, the direction of view is substantially oriented along the vehicle transverse axis y. These edge regions 19, 20 of the image 18 can be displayed together next to each other on the display 16, as it is schematically shown in FIG. 2. Therein, an image region 21 between the edge regions 19, 20 can be partially cut out such that the two edge regions 19, 20 as well as a cutout 21' of the central region 21 are contained in the displayed image 18'.

Thus, images 18' can be displayed on the display 16, which allow the driver of the motor vehicle 1 to recognize objects, which he cannot see himself due to restricted sight.

An exemplary road situation, in which the driver can be assisted by the images of the camera 3 (or of the camera 4 depending on the direction of travel), is schematically shown in FIG. 3. The motor vehicle 1 is in a garage exit 22, which is laterally bounded by two vertical walls 23, 24. The garage exit 22 extends across a pedestrian way 25 to a road 26. On the pedestrian was 25, there is a pedestrian 27, who moves towards the motor vehicle 1. Due to the restricted sight, the driver himself is not able to see the pedestrian 27.

An exemplary image, which can be captured in the road situation according to FIG. 3 by the camera 3, is shown in FIG. 4. As is apparent from FIG. 4, here too, the pedestrian 27' is depicted. If such an image 18 is displayed on the display 16, thus, this constitutes assistance to the driver.

However, situations also exist, in which an automated pedestrian recognition by means of the image processing device 15 is required. For example, this can be needed if the above mentioned assistance mode is deactivated, in which the images are displayed on the display 16. However, it can also occur that the driver does not recognize the pedestrian 27' despite of the displayed images since his direction of view currently for instance is not directed to the display 16. In order to automatically detect the pedestrian 27 by means of the image processing device 15, the following method is performed:

The method is explained in more detail with reference to the images of the camera 3, but is not restricted to the camera 3. In analogous manner, the method can also be applied to the images of the camera 4 and/or of the camera 5 and/or of the camera 6.

The image processing device 15 receives the images of the camera 3 and processes them. The image processing device 15 extracts characteristic features 28 from the images, as they are shown in FIG. 5 in abstract manner. The features denoted by 28 are detected in an image 18. In a subsequent image, then, characteristic features 28' are also detected and associated with the corresponding features 28 from the previous image 18. Thus, feature pairs 28, 28' are formed. As is apparent from FIG. 5, the features 28' are no longer in the same position in the image frame as the features 28. An optical flow vector 29 is respectively determined to each feature 28 by means of the image processing device 15, which connects the feature 28 to the associated feature 28' and is defined by its length (magnitude) on the one hand and by its direction on the other hand. The flow vector 29 characterizes the direction of movement and the speed of movement of the respective characteristic feature 28.

The characteristic features 28 do not have to be detected in the entire image 18. Depending on the application, for example, one or more regions of interest can be defined in the image 18, and the pedestrian recognition can be performed exclusively in the at least one region of interest. The determination of the features 28 can optionally also be performed exclusively in at least one preset region of interest of the image 18, such as for example in the image regions 19 and 20 of FIG. 2.

Depending on the characteristic features 28 and the flow vectors 29, the image processing device 15 determines the current values of a plurality of preset confidence metrics. A threshold value is preset for each confidence metric, and the image processing device 15 examines whether or not the confidence metrics exceed the respective threshold value. If all of the confidence metrics exceed the respective threshold value, thus, the pedestrian 27 is detected. The confidence metrics can be defined depending on the respective application. In the embodiment, the following confidence metrics are defined:

Feature Confidence Metric:

As a first property of the characteristic features 28, the number of characteristic features 28 is determined, on which a flow vector 29 and thus a movement has been detected. The feature confidence metric then corresponds to the number of these characteristic features 28.

Direction Confidence Metric:

As a second property, the direction of the flow vectors 29 is determined. The aim in the present embodiment is to detect a pedestrian 27, who moves towards the motor vehicle 1. Against this background, a direction confidence metric is defined, which is associated with the optical flow, which is directed towards the motor vehicle 1. For example, this can be configured such that the direction confidence metric is incremented or decremented over the sequence of images 18, namely depending on whether the number of the flow vectors 29 towards the motor vehicle 1 is greater than the number of the opposite flow vectors 29. If the number of the flow vectors 29 pointing towards the motor vehicle 1 is greater than the number of the opposite flow vectors 29, thus, the direction confidence metric can be incremented. In the converse case, this metric can be decremented.

Magnitude Confidence Metric:

As a further property of the flow vectors 29, the magnitude and thus the length thereof can also be determined. Depending on this magnitude, then, the current value of the magnitude confidence metric can be determined. For example, this can be configured such that the magnitude confidence metric corresponds to an average value of the magnitudes of the flow vectors 29 or of a selected subset of the flow vectors 29. This subset can for example include those flow vectors 29, which point towards the motor vehicle 1. Thus, false detections can be prevented, which else could be caused by noise in the images 18.

First Oscillation Confidence Metric:

As a further property of the flow vectors 29, the number of vectors 29 is determined, which have a magnitude increasing over the sequence of the images. To this, a first oscillation confidence metric can be defined, the value of which is dependent on this number and for example corresponds to this number.

Second Oscillation Confidence Metric:

Correspondingly, the number of flow vectors 29 can also be determined, which have a magnitude 29 decreasing over the sequence of images 18. To this, a second oscillation confidence metric can be defined, the value of which is dependent on this number and for example corresponds to this number.

By the two oscillation confidence metrics, an oscillating movement of the legs and the arms of the pedestrian 27 can be detected.

As already explained—a separate threshold value can be preset to each confidence metric. The image processing device 15 then examines whether or not all of the confidence metrics exceed the respectively associated threshold value. A detection of the pedestrian 27 occurs already and only if all of the confidence metrics exceed the associated threshold value.

The invention claimed is:

1. A method for detecting a pedestrian moving in an environmental region of a motor vehicle relatively to the motor vehicle based on temporal sequence of images of the environmental region, which are provided by a camera of the motor vehicle, the method comprising:

extracting characteristic features from the images;

determining a plurality of optical flow vectors to the characteristic features of at least two consecutively captured images of the sequence by an image processing device of the motor vehicle, wherein the plurality of optical flow vectors indicate a movement of the respective characteristic features over the sequence;

determining several confidence metrics for detecting the pedestrian, based on the characteristic features and the optical flow vectors, and based on the confidence metrics, wherein a threshold value is preset for each confidence metric; and examining whether a preset plausibility check criterion required for the detection of the pedestrian is satisfied, wherein the pedestrian is detected when the plausibility check criterion with respect to the confidence metrics is satisfied, wherein the preset plausibility check criterion includes that all of the confidence metrics pass the respectively associated threshold value.

2. The method according to claim 1, wherein a plurality of properties of the characteristic features and/or of the optical flow vectors is determined and a confidence metric is respectively defined to each property, the value of which is determined depending on the respective property.

3. The method according to claim 2, wherein the number of the characteristic features and/or of the optical flow vectors is determined as property.

4. The method according to claim 2, wherein a magnitude of the optical flow vectors is determined as a property.

5. The method according to claim 2, wherein a direction of the optical flow vectors is determined as a property.

6. The method according to claim 2, wherein as a property, the number of characteristic features is determined, the flow vectors of which have the same direction.

7. The method according to claim 2, wherein the characteristic features are tracked over the sequence of the images, and as a property of the characteristic features, a period of time is determined, which has elapsed since the first detection of the respective feature.

8. The method according to claim 2, wherein a change of the direction and/or a change of the magnitude of the optical flow vectors over the sequence are determined as a property.

9. The method according to claim 2, wherein the number of the flow vectors is determined as a property, which have a magnitude decreasing over the sequence of the images, and/or the number of the flow vectors is determined as a property, which have a magnitude increasing over the sequence of the images.

10. A camera system for a motor vehicle including a camera for providing a sequence of images of an environmental region of the motor vehicle and including an image processing device configured to perform a method according to claim 1.

* * * * *